United States Patent [19]

Heinrich et al.

[11] Patent Number: 4,853,121

[45] Date of Patent: Aug. 1, 1989

[54] CHAMBER FILTER PRESS

[75] Inventors: Hans J. Heinrich, Ennepetal; Max Oelbermann, Remscheid, both of Fed. Rep. of Germany

[73] Assignee: Rittershaus & Blecher GmbH

[21] Appl. No.: 891,171

[22] Filed: Jul. 31, 1986

[30] Foreign Application Priority Data

Aug. 1, 1985 [DE] Fed. Rep. of Germany ....... 3527556

[51] Int. Cl.$^4$ ..................... B01D 25/12; B01D 25/32
[52] U.S. Cl. .................................. 210/225; 210/228; 210/231; 100/198; 100/211
[58] Field of Search ............... 210/225, 227, 231, 228; 100/211, 193, 198

[56] References Cited

U.S. PATENT DOCUMENTS

| | | | |
|---|---|---|---|
| 3,390,772 | 7/1968 | Juhasz | 210/225 |
| 3,503,326 | 3/1970 | Juhasz et al. | 210/225 |
| 3,957,645 | 5/1976 | Kurita et al. | 210/231 |
| 3,988,242 | 10/1976 | Kurita et al. | 210/227 |
| 4,053,416 | 10/1977 | Howard et al. | 210/227 |
| 4,235,721 | 11/1980 | Nakamura et al. | 210/227 |
| 4,397,746 | 8/1983 | Kratochvil | 210/231 |
| 4,617,863 | 10/1986 | Kenyon | 210/228 |

*Primary Examiner*—Benoit Castel
*Attorney, Agent, or Firm*—Antonelli, Terry & Wands

[57] ABSTRACT

A chamber filter press including frameless chamber plates covered on both sides with filter clothes stretched thereover, wherein two adjacent chamber plates contact each other with an outer, continuous clamping rim and define a filter chamber, consisting of a central filter cake compartment lying between the filter cloths and two outer filtrate compartments lying between the plate and the filter cloth. Repressing devices for the filter cake are arranged in the zone of at least one of the two filtrate compartments of each filter chamber. The repressing devices are fashioned as distensible cushions suspended within at least one filtrate compartment of each filter chamber at the adjoining chamber plate by marginal suspension strips which keep open, at least at the lower edge of the distensible cushion. A liquid passage is provided between the half of the filtrate compartment on the filter cloth side and the half on the plate side.

15 Claims, 8 Drawing Sheets

CHAMBER FILTER PRESS

BACKGROUND OF THE INVENTION

The invention relates to a chamber filter press with frameless chamber plates covered respectively on both sides with filter cloths stretched thereover, wherein two adjacent chamber plates contact each other with an outer, continuous clamping rim and define between them a filter chamber, which includes a central filter cake compartment lying between the filter cloths and two outer filtrate compartments lying respectively between the plate and the filter cloth, and with repressing devices for the filter cakes arranged in the zone of at least one of the two filtrate compartments of each filter chamber.

A chamber filter press of the aforementioned type is proposed, for example, DOS No. 2,754,537. The repressing devices set forth therein involve separate press diaphragms stretched over the chamber plates in addition to the filter cloths. In this way, a pressure medium compartment is formed between the press diaphragms and the filter plates; this compartment, due to the high pressing pressures, must be carefully sealed with respect to the outside. A special problem is created in connection with the seal between the pressing medium compartment and the slurry feed ducts and, respectively, filtrate discharge ducts, and for this reason the reference requires special, structurally expensive sealing elements. However, leaks can also readily occur in the remaining zones of the continuous clamping frame since the clamping forces of the pressing diaphragm depend directly on the maximum closing pressure that can be exerted on the plate pack. Due to these difficulties, it is almost impossible to retrofit older chamber filter presses, lacking repressing devices, with press diaphragms.

DOS No. 3,317,235 and DOS No. 3,128,970 disclose frame filter presses wherein press diaphragms are attached between supporting plates and separate clamping frames. As described in greater detail in the aforementioned references, sealing of the press medium compartment is, in this type of structure, simpler than in case of the above-described chamber filter presses, but even in frame filter presses, leakages can develop after a long-term operation due to creep phenomena, and also in these structures, the sealing effect depends decisively on the closing pressure of the press. In any event, however, it is absolutely impossible to retrofit an older frame filter press, lacking repressing devices, by adding frames inserted between the chamber plates inasmuch as thereby the thickness of the plate pack would be unduly increased.

The invention is based on the object of providing a chamber filter press of the type discussed above, the repressing devices of which are simple and economical in manufacture, mounting, and servicing; in this connection, it is also to be possible, in particular, to effect subsequent installation in chamber filter presses at low cost.

This object has been attained according to this invention by providing that the repressing devices are distensible cushions which are suspended within at least one filtrate compartment of each filter chamber at the respectively adjoining chamber plate by way of mounting means keeping open, at least along the lower edge of the distensible cushion, a liquid passage between the half of the filtrate compartment on the filter cloth side and the half on the plate side. By the utilization of distensible cushions, the sealing of the press medium with respect to the slurry feed conduits and the filtrate discharge conduits becomes practically independent of the closing pressure of the chamber filter press. In other words, the closing pressure needs to be only of such a level that, when the distensible cushions are placed under pressure, the plate pack is just barely held together. Additional sealing forces are unnecessary. In the retrofitting of older chamber filter presses, the advantage is thereby obtained, in particular, that the mutually contacting clamping edges of the chamber plates need not be reworked with a view toward sealing of the repressing devices. The suspension of the distensible cushions at the respectively adjoining chamber plate by way of special mounting means takes care of preventing that the distensible cushions, even in the non-pressurized condition, do not collapse and thus retain a perfect positioning with respect to the filter cloths. Due to the liquid connection between the half of the filtrate compartment on the filter cloth side and the half on the plate side, it is finally possible to discharge the filtrate through simple bores on the plate side without the necessity of interposing additional discharge elements between the filter cloth and the distensible cushion.

Although U.S. Pat. No. 270,807 discloses the use of distensible cushions in filter presses, the distensible cushion in the reference is loosely inserted into separate chamber defined on both sides by movable pressure plates which latter are urged against the adjoining filter cloths and thus against the filter cake when the distensible cushion is placed under pressure. The construction set forth in the reference, however, requires an expensive, additional supporting housing for the distensible cushion so that it is unsuitable for retrofitting of older chamber filter presses. Moreover, the pressure plates in the reference can readily be jammed and seized with an even slight change in position of the distensible cushion and/or in case of a contamination of the pressure plate guide means.

DAS No. 1,218,999 also describes a filter press with distensible cushions for pressing out the filter cake. However, in the reference, the distensible cushion is arranged in the filter cake compartment so that two small filter cakes are produced instead of one large filter cake. The small filter cakes, after opening the plate pack, can be detached from the filter cloth only with difficulties due to their low weight. Moreover, in the construction of the reference, an internal supporting ring and an external, additional supporting frame are required for holding the distensible cushion; thereby making retrofitting of older chamber filter presses impossible in any event. Furthermore, the supporting frame impedes washing of the filter cloths when the plate pack is opened up.

According to a preferred embodiment of the invention, the mounting means includes a marginal suspension strip attached at least along the upper edge of the distensible cushion, with the strip being placed around the clamping rim of the respective chamber plate and being suspended via mounting pins or the like at the outer edge of the chamber plate, for example, together with the filter cloths. With the aid of the edge suspension strip, the distensible cushions can be stretched over the chamber plates completely analogously to the filter cloths whereby, during retrofitting of older chamber filter presses, there is no need for additional holding means at the chamber plates. If an exchange of distensible cushions is needed after a relatively long operating period, this servicing work can take place as a matter of routine, just as exchanging filter cloths.

According to the invention, the edge suspension strip can be a permeable fabric strip extending entirely around the distensible cushion. An especially exact positioning is obtained by the all-around clamping mounting of the distensible cushion, remaining the same at all times. Yet, due to the use of a permeable fabric, transfer of filtrate from the half of the filtrate compartment on the filter cloth side to the half on the plate side is ensured.

According to the invention, the edge suspension strip can be provided with several passage openings directly beside the outer rim of the distensible cushion. In this way, transfer of filtrate from the filter cloth to the chamber plate is ensured in any event.

According to an alternative embodiment of the invention, the mounting means may include guide pins projecting from a primary surface of the cushion and being associated with mounting holes provided at the chamber plates. Also in this embodiment, no expensive reworking steps are needed when retrofitting older chamber filter presses, since chamber filter plates are customarily equipped with mounting bores for ducting mats which bores, in this case, can be used for the guide pins of the distensible cushions.

In accordance with a further version of the invention, the filter cloth defining the filtrate compartment accommodating the distensible cushion can simultaneously serve as a mounting means for the distensible cushion, there being provided one or several connecting members between the distensible cushion and the filter cloth. Advantageously, detachability of the connecting members is afforded herein so that the filter cloths, exhibiting a relatively short service life, can be exchanged independently of the distensible cushions.

In another embodiment, the distensible cushion can exhibit a sealed passage opening in the region of a central slurry feed duct on the plate side. In this way, distensible cushions can also be utilized for a widely popular type of construction of chamber filter presses wherein the slurry feed duct extends centrally through the plate pack, i.e. is not extended in the zone of the clamping rim of the chamber plates. When using distensible cushions, no sealing problems are encountered, either, in this structural version, whereas when using simple press diaphragms, sealing is especially problematic precisely in central slurry feed, as demonstrated, for example, by the complicated construction in U.S. Pat. No. 3,888,769.

In accordance with a further embodiment of the invention, the filter cloths, stretched on both sides over a chamber plate, can be joined by way of a filter cloth sleeve in the zone of the central feed duct, and the distensible cushion can include a stiff diaphragm material and can be suspended at the filter cloth sleeve in the region of the cushion passage openings. Since the distensible cushion is supported at all times on both sides in the unpressurized as well as pressurized condition, by the plate and by the pretensioned filter cloth, it is possible by using a stiff diaphragm material to attain a defined positioning of the distensible cushion even without an additional suspension means.

According to the invention, the distensible cushion can exhibit respectively one sealed passage opening in the zone of supporting cogs on the plate side. Adjacent chamber plates thus can come into full contact with each other along their outer clamping rims in spite of the use of distensible cushions whereby satisfactory sealing of the interposed filter chamber remains ensured.

In Accordance with further advantageous features of the present invention, the distensible cushion has, in an area or zone of a slurry feed duct on the plate side and juxtaposed supporting cogs on the plate side, an oval passage opening encompassing or surrounding the supporting cogs and the slurry feed duct.

Moreover, the present invention proposes providing a construction wherein the distensible cushions include two diaphragms in flat contact with each other along their edges which are tightly joined by, for example, welding or gluing.

Advantageously, the distensible cushions are provided on the filter cloth side with ducting in the form of a raised rib system or nubs, grooves, fluting, or the like.

According to the present invention, at least one ducting mat is arranged between the distensible cushion and the filter cloth and, advantageously, the distensible cushions are in communication with a pressure medium conduit which lies outside of the plate pack and is common to all of the cushions by way of a connecting conduit through the clamping rim of the chamber plate.

In accordance with further features of the present invention, the repressing devices may be in the form of distensible cushions which include a stiff diaphragm material and which are arranged within at least one filtrate compartment of each filter chamber, and, at least at the lower edge of the distensible cushion, a liquid passage is provided between the path of the filtrate compartment on the filter cloth side and the half on the side plate.

BRIEF DESCRIPTION OF THE DRAWINGS

The invention will be described in greater detail below with reference to several embodiments illustrated in the drawings wherein.

DETAILED DESCRIPTION

Figure 1:
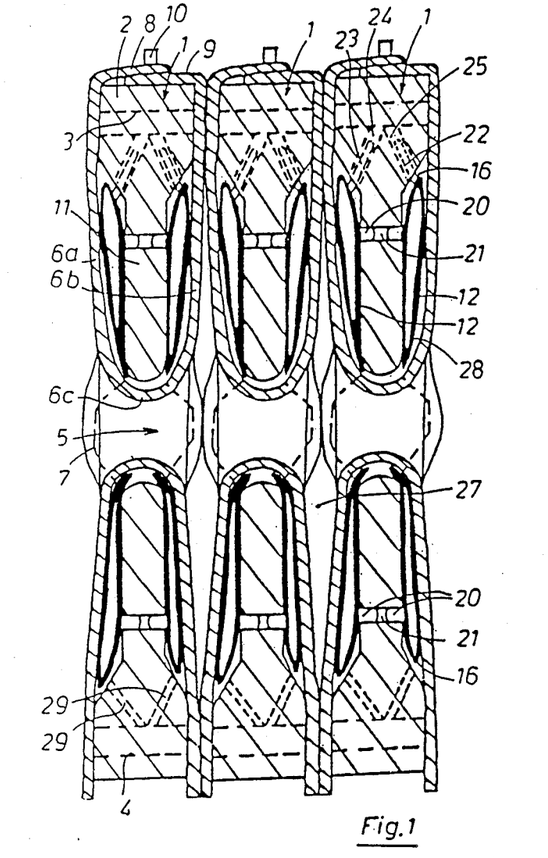
FIG. 1 shows, in a vertical, longitudinal central section, a small group of successive chamber plates of a chamber filter press according to a first embodiment of the invention.
Figure 2:
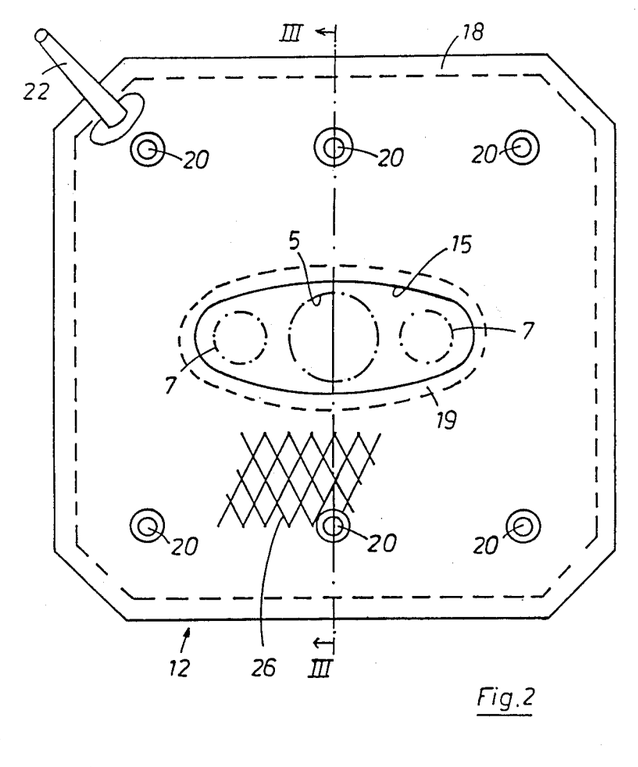
FIG. 2 shows a lateral view of the primary surface, on the plate side, of a distensible cushion as those utilized in the embodiment of FIG. 1
Figure 3:
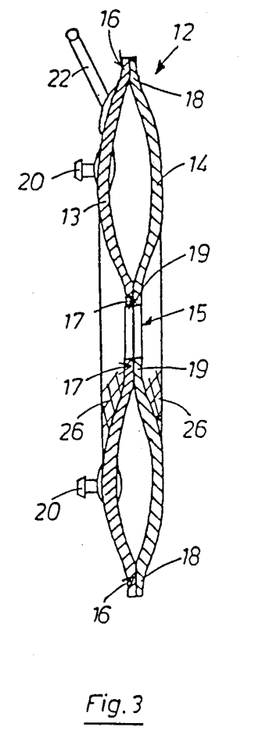
FIG. 3 shows the distensible cushion along section III—III in FIG. 2.

In the embodiment according to FIGS. 1–3, a chamber filter press comprises a plurality of identical, successive chamber plates generally designated by the reference numeral 1 designed in the usual way. They exhibit a continuous, thickened clamping rim 2, axial passage ducts being respectively provided in the corner zones of the clamping rim 2, one of the upper ducts serving as the pressure medium duct 3 for repressing a filter cake, and the second upper duct, as well as the other lower ducts serving as filtrate discharge ducts 4. Each chamber plate 1 is provided in its center with a passage opening serving as the slurry feed duct generally designated by the reference numeral 5.

Filter cloths 6a, 6b are respectively stretched on both sides over the chamber plates 1, with the cloths 6a, 6b being joined together in a region of the central passage opening 5 by way of a filter cloth sleeve 6c. Furthermore, each filter plate 1 includes two supporting cogs 7 located diametrically beside the passage opening 5, with the cogs 7 being covered by the stretched filter cloths 6a, 6b and resting on identical supporting cogs 7 of the neighboring chamber plates 1. The filter cloths 6a, 6b exhibit folded down rims 8, 9 provided with holes, by means of which they are suspended at mounting pins 10 of the chamber filter plate 1.

One annular distensible cushion generally designated by the reference numeral 12 is respectively arranged in each filtrate compartment between the interiorly disposed zone 11, reduced in wall thickness, of the chamber plate 1 and the filter cloths 6a and 6b, respectively. Each distensible cushion 12 includes two elastic diaphragms 13, 14 equipped with a central aperture generally designated by the reference numeral 15 for the passage of slurry and being tightly connected with each other along their outer edge 16 as well as their inner edge 17 along marginal strips 18, 19 in flat contact with each other, which is done, for example, by welding or gluing. The distensible cushion 12 has mounting means in the form of guide pins 20 projecting toward one side and inserted in associated mounting bores 21 of the chamber plates 1. Furthermore, each distensible cushion 12 is provided with a connecting nipple in the form of a hose 22, 23 tightly fitted respectively into a connecting duct 24, 25, for example by gluing, this connecting duct leading to a pressure medium duct 3.

As shown in FIG. 2, the central opening 15 of the distensible cushion 12 is fashioned as an oval in such a width that the two supporting cogs 7, 7 adjacent the slurry feed duct 5 of the plate 1 are likewise covered by the opening 15. Accordingly, the cushion 12 is not pressed in place between the supporting cogs 7, 7 of adjacent plates and thus also the clamping rims 2 of a plate pack are in close mutual contact. Furthermore, FIG. 2 indicates schematically ducting in the form of a rib system 26 arranged at least on the primary surface of the distensible cushion 12 on the filter cloth side.

After a filter cake has been formed in the filter cake compartment 27 lying between two filter cloths 6a, 6b, the distensible cushions 12 are placed under high pressure so that the filter cake is squeezed out from both sides by the expanding cushions 12. The pressed-out fluid passes during this step through the filter cloths 6a, 6b into the filtrate compartment 28 and then travels along the rib system 26 to the outer edge 16 of the distensible cushions 12. The distensible cushions 12 are fitted into the filtrate compartment 28 in such a way that a passage remains open toward the rearward half of the filtrate compartment 28 and the filtrate can be passed on to the filtrate discharge ducts 4 by way of connecting ducts 29 on the plate side.

The structure according to FIGS. 1–3 with two distensible cushions 12 per filter chamber is especially advantageous in case of filter cake material sticking very tenaciously to the filter cloths 6a, 6b, because the filter cakes can herein be blasted off after opening of the chamber plates 1 by exposing the expansion pads 12 to bursts of pressure. For most types of slurry, though, the arrangement of a single distensible cushion is sufficient; besides resulting in financial savings, this arrangement also reduces the filter cake compartment 27 to a lesser extent.

Figure 4:
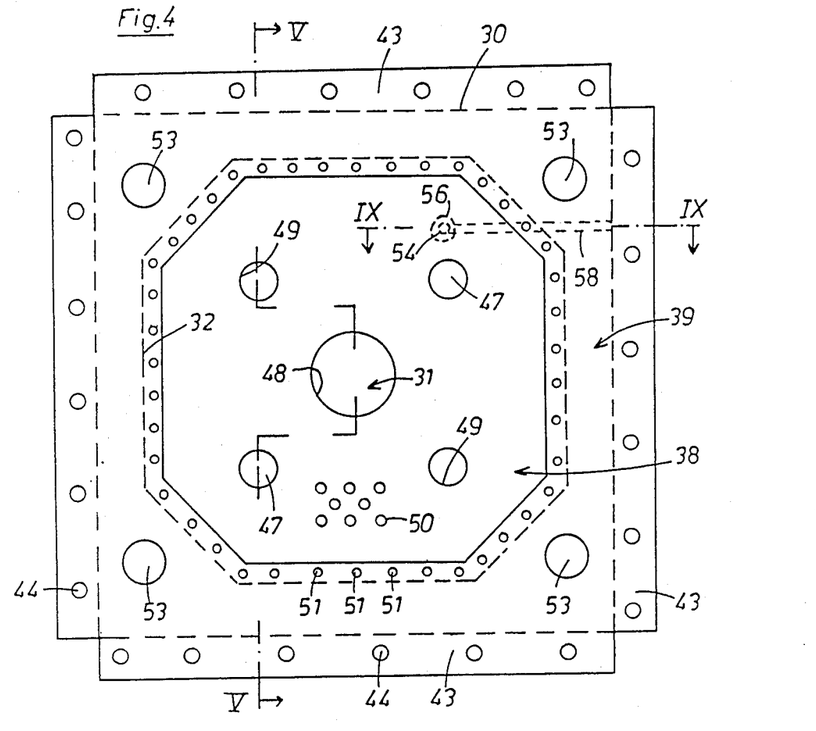
FIG. 4 shows a view of the primary surface of a distensible cushion, on the filter cloth side, with an obscured chamber plate disposed therebehind, in accordance with a second embodiment of the invention.

In the embodiment of FIGS. 4–9 the chamber filter press again comprises a plurality of identical, successive chamber plates 30 with a central slurry feed duct 31, with the plates 30 being in contact with one another with an outer, continuous clamping rim 32. Chamber plates 30 are covered on both sides with filter cloths 33a, 33b stretched thereover and joined to each other in the zone of the slurry feed duct 31 by way of a filter cloth sleeve 33c. As can be seen from FIG. 5, two chamber plates 30 encompass between them respectively one filter compartment 34 which latter includes a central filter cake compartment 35 lying between the filter cloths 33a, 33b and two outer filtrate compartments 36, 37 lying respectively between the plate 30 and the filter cloths 33a and 33b. One expansion pad 38 as a re-pressing device for the filter cake is suspended in one of the two filtrate compartments 37. The mounting means for a distensible cushion 38 is constituted by a continuously extending, liquid-permeable edge suspension strip 39 of a woven material glued in place at the outer rim 40 of the distensible cushion 38 made up of two diaphragms 41, 42. The edge suspension strip 39 is placed around the clamping rim 32 of the respective chamber plate 30 and exhibits on all sides external end sections 43 projecting past the plate 30. The end sections carry suspension bores 44 for mounting to holding pins 45 inserted at the upper outside rim of the filter plate 30 and serving at the same time for attachment of the filter cloths 33a, 33b. At the lateral and bottom outer rims, the filter cloths 33a, 33b and the end sections are tensionally fastened together by means of so-called cloth ties 46. FIG. 4 here shows the end sections 43 in the not as yet suspended condition.

The filter plates 30 involve a relatively large structural component exhibiting four supporting cogs 47 in the zone of the filter chamber 34, distributed around the central slurry feed duct 31. In case of a plate structure of a synthetic resin, it would also be possible basically to provide, for example, eight supporting cogs. The distensible cushion 38 thus comprises, besides a central, sealed passage aperture 48 for the slurry duct 31, four additional passage openings 49 for the supporting cogs 47 so that perfect contacting of the outer clamping rims 32 of the chamber plate 30 remains ensured.

Figure 5:
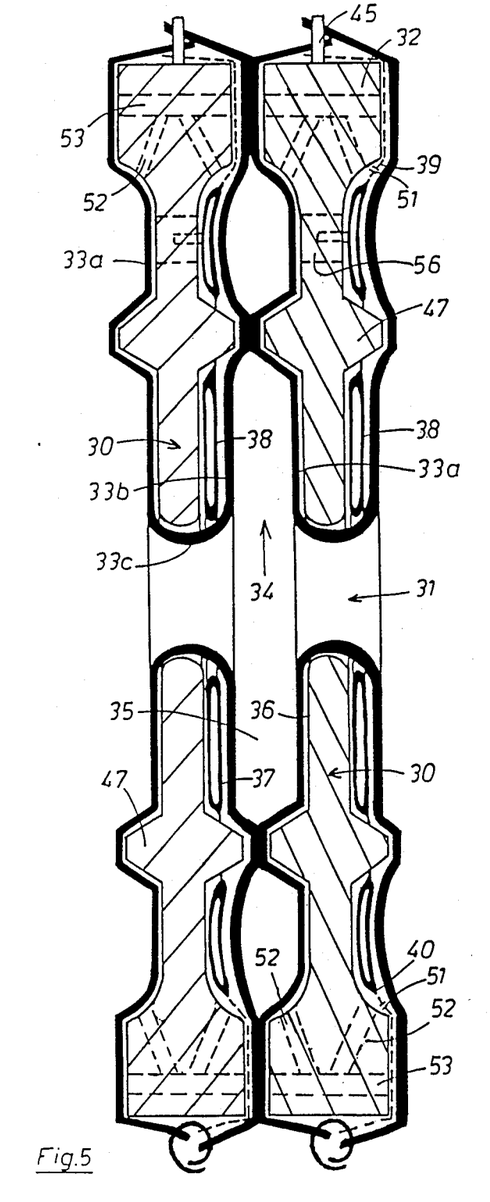
FIG. 5 shows a small group of successive chamber plates illustrated analogously to FIG. 1 along a section V—V in FIG. 4.
Figure 6:
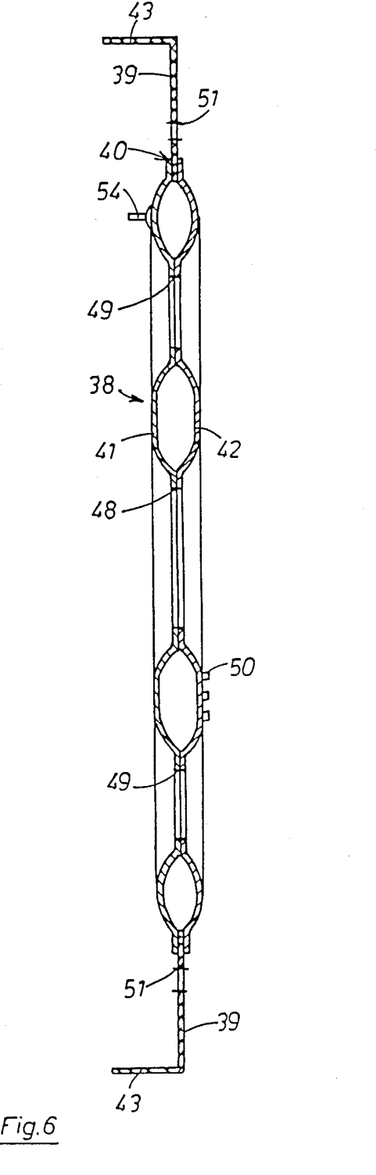
FIG. 6 shows a single distensible cushion of the embodiment according to FIGS. 4 and 5 in a sectional illustration analogous to FIG. 5.
Figure 7:
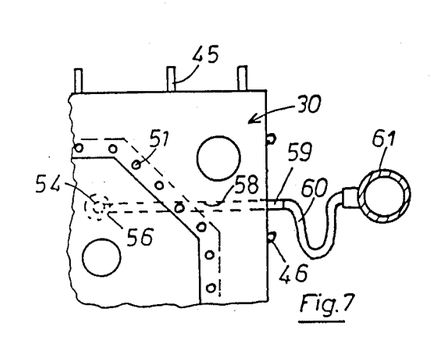
FIG. 7 shows a corner section of the chamber plate with a fixedly suspended distensible cushion arranged in front thereof, and with an external pressure medium conduit.
Figure 8:
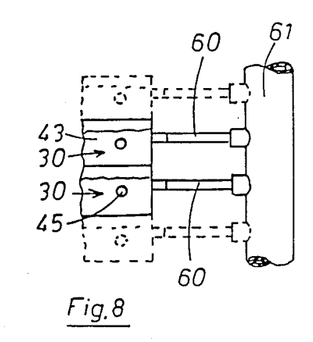
FIG. 8 shows a small group of successive chamber plates in viewing direction VIII in FIG. 7.

During filtration, the slurry is conducted via the slurry feed duct 31 into the filter cake compartment 35 and penetrates through the filter cloths 33a, 33b into the filtrate compartments 36, 37. In order to make sure that the filtrate flows away toward the outer rim 40 of the distensible cushion 38 arranged in the filtrate compartment 37, the cushion is equipped with ducting in the form of nubs 50 at least on its primary surface facing the filter cloth 33b; these nubs are indicated in the drawings only regionally. The filtrate can at that location enter into the half of the filtrate compartment 37 on the plate side, through the permeable edge suspension strip 39. To facilitate passage of the filtrate, passage openings 51 are additionally provided herein. Thereafter, the filtrate can be transferred via connecting ducts 52 to four filtrate discharge ducts 53 extending in the corner zone of the clamping rim 32.

Figure 9:
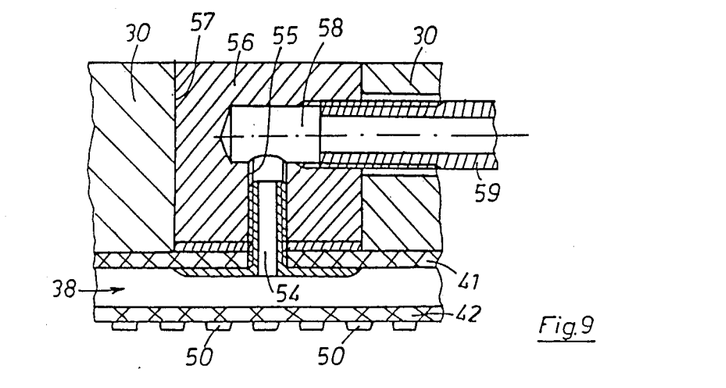
FIG. 9 shows the pressure connection of the distensible cushion according to a section IX—IX in FIG. 4.

The expansion pads 38 can be exposed to high pressure by way of valve nipples 54 in order to press out the filter cakes. The nipples 54 are respectively threaded into an axial threaded bore 55 of a cylindrical intermediate member 56 as shown in FIG. 9. The intermediate member 56 threaded is fitted into a passage bore 57 of the filter plate 30. In the case of retrofitting of an older chamber filter press, passage bore 57 can be subsequently provided at low cost. The threaded bore 55 of the valve nipple 54 terminates in a transverse bore 58 extending from the connecting member 56 to the lateral outer rim of each chamber plate 30. To provide a seal between the intermediate member 56 and the chamber plate 30, a feed pipe 59 is threaded into the transverse bore 58, but other designs for sealing purposes are likewise possible. Finally, respectively one flexible hose 60 is connected on the outside to the feed pipe 59, this hose leading to a pressure medium conduit 61 common to all distensible cushions 38. This arrangement of the pressure connection of the distensible cushions 38 has the advantage over the embodiment of FIG. 1 that the pressure medium can be sealed off at the combined main conduit as well as in the zone of the expansion pad connection in an especially secure and permanent fashion.

Figure 10:
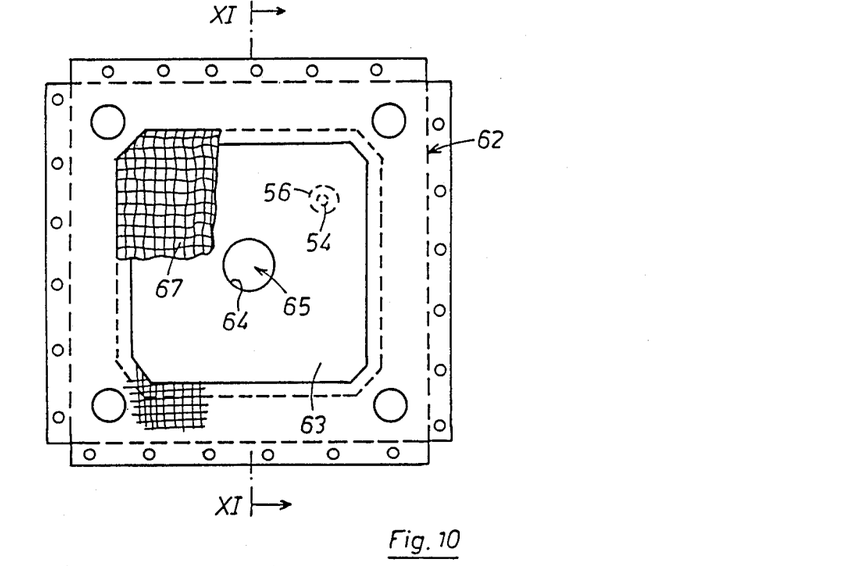
FIG. 10 is a view of the primary surface of a distensible cushion on the filter cloth side with a chamber plate located therebehind, in accordance with another embodiment of the invention.
Figure 11:
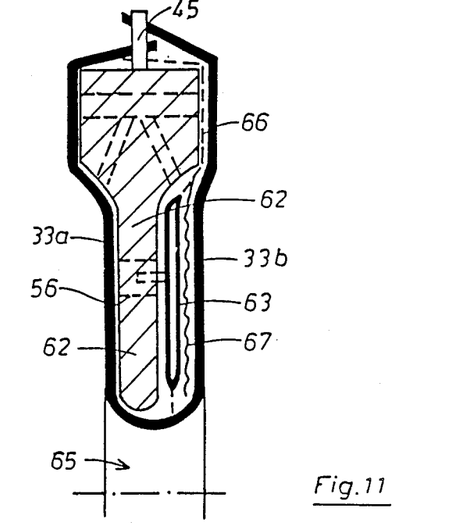
FIG. 11 shows the chamber plate and the distensible cushion after a filter cloth has been stretched thereover, along a section XI—XI in FIG. 10.

In FIGS. 10 and 11, another embodiment of a chamber filter press is illustrated, with relatively small chamber plates 62 which do not require supporting cogs. Consequently, an associated distensible cushion 63 exhibits merely one central, sealed passage opening 64 for the slurry feed duct 65. The distensible cushion 63, in turn, is suspended at the chamber plate 62 with a continuously extending edge suspension strip 66. Since the edge suspension strip 66 consists of an especially coarse, permeable fabric, no special passage apertures are required for the discharge of filtrate. The distensible cushion 63 is covered on the side of the filter cloth 33b with a ducting mat 67 to conduct the filtrate away, so that the distensible cushion 63 proper can be made of smooth diaphragms. The ducting mat 67 can include a coarse wire or synthetic resin mesh and is fastened to the edge suspension strip 66 of the expansion pad 63, for example, by clamps.

Figure 12:
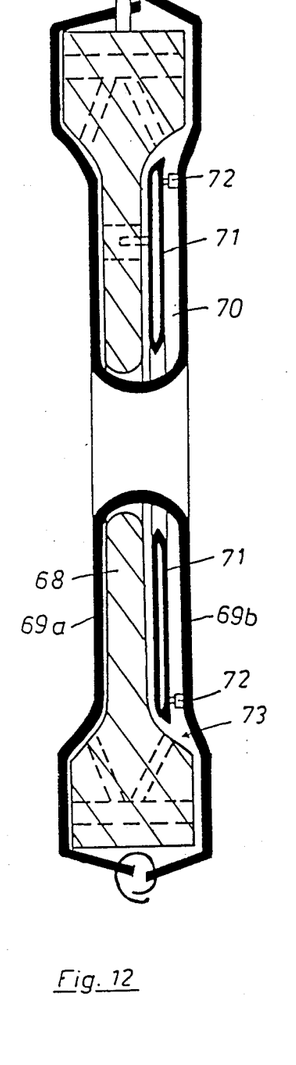
FIG. 12 shows a chamber plate with distensible cushion and filter cloth according to a further embodiment of the invention in an illustration analogous to FIG. 5.

FIG. 12 shows a further embodiment of a chamber plate 68 covered on both sides with filter cloths 69a, 69b stretched thereover. A distensible cushion 71 is located in the filtrate compartment 70, which latter is bounded by the chamber plate 68 and the filter cloth 69b. The cushion 71 is suspended at the filter cloth 69b by connecting members 72. Accordingly, the filter cloth 69b, besides performing its filtering function, simultaneously takes over the task of a mounting means between the distensible cushion 71 and the chamber plate 68. Due to the suspension of the distensible cushion 71 in the filtrate compartment 70, a relatively large gap 73 remains at its lower edge, through which the filtrate can pass from the half of the filtrate compartment 70 on the filter cloth side to the half on the plate side.

Figure 13:
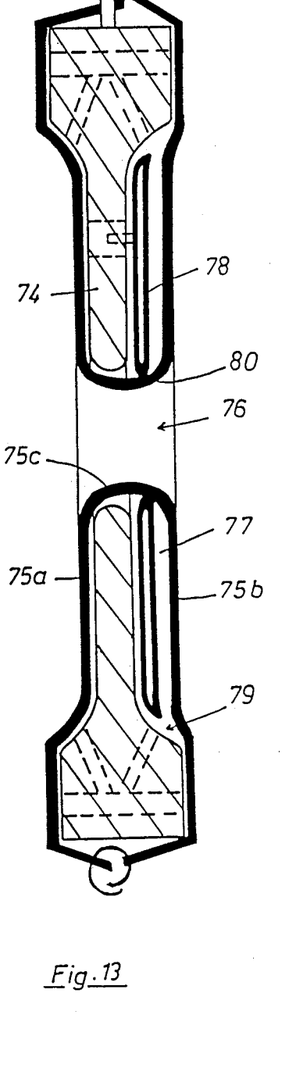
FIG. 13 shows a chamber plate with distensible cushion and filter cloth according to a fifth embodiment of the invention.

FIG. 13 shows a chamber plate 74 covered on both sides with filter cloths 75a, 75b stretched thereover, these cloths being joined, in turn, in the region of a central slurry feed duct 76 by a filter cloth sleeve 75c. In the filtrate compartment 77 lying on the side of the filter cloth 75b, a distensible cushion 78 is arranged consisting of a relatively stiff diaphragm material, e.g. hard rubber or an elastomer. Insofar, the distensible cushion 78 retains, in the unpressurized condition, its shape, even if it is not suspended along its upper rim, especially since a constant lateral support is provided by the filter cloth 75b and the chamber plate 74. In order to obtain an adequately large filtrate passage slot 79 at the bottom edge of the distensible cushion 78, the latter is suspended in the zone of its central slurry passage opening 80 at the filter cloth sleeve 75c.

Figure 14:
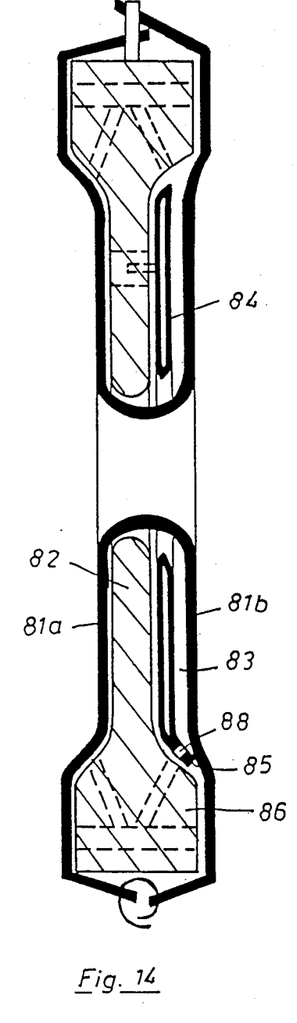
FIG. 14 shows a chamber plate with distensible cushion and filter cloth according to a sixth embodiment of the invention.
Figure 15:
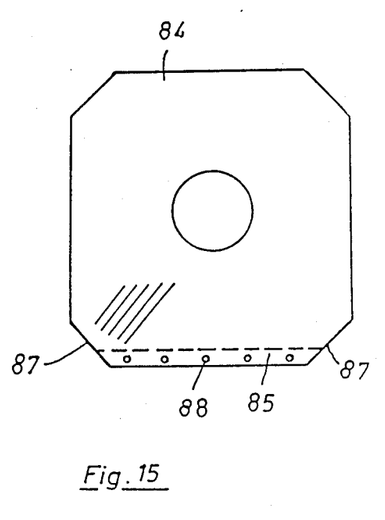
FIG. 15 shows the distensible cushion of the chamber plate of FIG. 14 in an illustration analogous to FIG. 10.

FIGS. 14 and 15 illustrate a chamber plate 82 covered on both sides with filter cloths 81a, 81b stretched thereover. A distensible cushion 84 of a stiff diaphragm material is arranged in the filtrate compartment 83 located on the side of the filter cloth 81b; this cushion 84 rests with its bottom supporting edge 85 on the lower, thickened clamping rim 86 of the filter plate 82. With respect to its outer contours, the distensible cushion 84 is designed to be somewhat smaller than the filtrate compartment 83 so that the filtrate can pass in the upper zone and on the side, especially also at the bottom corners 87, from the half of the filtrate compartment 83 on the filter cloth side to the half on the plate side. In order to afford passage of relatively large filtrate quantities also at this location, the supporting edge 85 is additionally equipped with passage openings 88. This arrangement of the repressing device is likewise particularly well suited for retrofitting older chamber filter presses since no adjustment work whatever is required for the chamber plate 82.

We claim:

1. A chamber filter press comprising a pack of frameless chamber plates covered on respective sides thereof with filter cloths stretched thereover, two adjacent chamber plates contact each other with an outer continuous clamping ring and define between them a filter chamber, said filter chamber including a central filter cake compartment lying between the filter cloths and two outer filtrate compartments lying respectively between the chamber plate and the filter cloth, repressing means for the filter cakes arranged in a zone of at least one of the two filtrate compartments of each filter chamber, a central aperture means disposed in each chamber plate for enabling a feeding of slurry with a filter cloth sleeve penetrating the central aperture means and connected to the filter cloths on the respective sides of the chamber plate, said repressing means including distensible annular cushions, means for mounting a distensible annular cushion within at least one filtrate compartment of each filter chamber at an adjoining chamber and for keeping open, at least along a lower edge of the distensible cushion, a liquid passage between the half of the filtrate compartment on a filter cloth side and the half on the plate side, wherein the chamber plates in a central area thereof are provided with support cog means which rest against each other when a filter plate pack is closed, and wherein each distensible annular cushion includes two elastic diaphragms, each diaphragm having a central aperture and the two diaphragms being tightly connected with each other along an outer edge thereof and along an inner edge thereof along marginal strips in flat contact with each other.

2. A chamber filter press according to claim 1, wherein the mounting means includes an edge suspension strip attached at least at the upper edge of each of the respective distensible cushions, each of said edge suspension strips being placed around the clamping rim of the respective chamber plate and suspended by holding means at an outer edge of the chamber plate with the filter cloths.

3. A chamber filter press according to claim 2, wherein each edge suspension strip includes a permeable fabric strip extending entirely around its associated therein distensible cushion.

4. A chamber filter press according to one of claims 2 or 3, wherein each edge suspension strip is provided with several passage openings directly adjacent an outer edge of the associated distensible cushion.

5. A chamber filter press according to claim 1, wherein the mounting means includes guide pins projecting from a primary cushion surface area of the distensible cushions, and wherein mounting holes are provided at the chamber plates for accommodating the guide pins.

6. A chamber filter press according to claim 1, wherein the filter cloth delimiting a filtrate compartment accommodating a distensible cushion simultaneously serves as a mounting means for the distensible cushion, and wherein at least one connecting member is provided between the distensible cushion and the filter cloth.

7. A chamber filter press according to claim 1, wherein the central apertures of the diaphragms of each distensible cushion form a sealed passage opening in a zone of the associated central aperture means for feeding slurry.

8. A chamber filter press according to claim 7, wherein the distensible cushions respectively include a stiff diaphragm material and are suspended at the filter cloth sleeve in a zone of a passage opening thereof.

9. A chamber filter press according to claim 1, wherein the distensible cushions respectively include at least one sealed passage opening in a zone of supporting cog means provided on a plate side of the chamber filter press.

10. A chamber filter press according to claim 1, wherein the central apertures of the diaphragms of each distensible cushion form a substantially oval passage opening encompassing the supporting cog means and the central aperture means for feeding slurry.

11. A chamber filter press according to claim 1, wherein the two diaphragms are tightly joined by one of welding and gluing.

12. A chamber filter press according to claim 1, wherein the distensible cushions are provided on the filter cloth side with ducting means including one of a raised rib, nubs, grooves, and fluting.

13. A chamber filter press according to claim 1, wherein one ducting mat is arranged between a distensible cushion and the adjacent filter cloth.

14. A chamber filter press according to claim 1, wherein the distensible cushions are in communication with a pressure medium conduit lying outside of the plate pack and is common to all of the distensible cushions by a connecting conduit means extending through the clamping rim of the chamber plate.

15. A chamber filter press comprising a pack of frameless chamber plates covered on respective sides with filter cloths stretched thereover, two adjacent chamber plates contact each other with an outer continuous clamping rim and define between them a filter chamber, said filter chamber including a central filter cake compartment lying between the filter cloths and two outer filtrate compartments lying respectively between the plate and the filter cloth, each chamber plate being provided in its center with aperture means for enabling a feeding of slurry with a filter cloth sleeve penetrating the central aperture means and connected to the filter cloths on the respective sides of the chamber plate, repressing means for the filter cakes arranged in the zone of at least one of the two filtrate compartments of each filter chamber, the repressing means including distensible cushions comprising a stiff diaphragm material and arranged within at least one filtrate compartment of each filter chamber, said distensible cushions having a central aperture for the passage of slurry and wherein at least at the lower edge of the distensible cushions, a liquid is provided between a half of the filtrate compartment on the filter cloth side and the half on the plate side and wherein the chamber plates, in a central area thereof are provided with support means which rest against each other when a filter plate pack is closed.

* * * * *